United States Patent Office 3,481,829
Patented Dec. 2, 1969

3,481,829
METHOD OF SIZING PAPER WITH SILICONE RESIN AND OF MAKING GYPSUM WALLBOARD THEREFROM
John D. Shull, Jr., and John W. Klems, Tonawanda, N.Y., assignors to National Gypsum Company, Buffalo, N.Y., a corporation of Delaware
No Drawing. Filed July 27, 1967, Ser. No. 656,344
Int. Cl. D21d *3/00;* D21h *3/36*
U.S. Cl. 162—164                                  10 Claims

ABSTRACT OF THE DISCLOSURE

In the manufacture of paper for use in the manufacture of gypsum wallboard therefrom, wherein a cured hydrophobic organo-silicone sizing is provided on at least the inner surface of the paper, the method of catalyzing the silicone resin cure by the addition of alum to the uncured silicone resin prior to addition of the resin to the paper or by applying the alum to the paper subsequent to the formation of the paper and separate from the addition of the resin to the paper.

BACKGROUND OF THE INVENTION

This invention relates to an improvement in the previously known methods of making paper having at least one water-repellent surface having thereon a cured hydrophobic organo-silicone resin, and to the manufacture of gypsum wallboard therefrom with the water-repellent paper surface at the interface of the paper and the gypsum core. Considerable work has been carried on, all quite recently, in improved gypsum board manufacture, involving paper with water-repellent inner surfaces, the initial work being described in Bieri U.S. Patent 3,307,987. The methods disclosed in the Bieri patent, although successful, lacked a degree of wet bond of gypsum core to paper generally required in board manufacture, and this problem was overcome by the use of organo-silicones, as described in U.S. Ser. No. 344,582 filed, Feb. 13, 1964 by Bieri and Coia, now abandoned and also described in a continuation-in-part thereof, U.S. Ser. No. 522,094, filed Jan. 21, 1966, by Bieri and Coia, now U.S. Patent 3,389,042.

As set forth in Patent 3,389,042, it was known that the curing rate of the organo-silicones used in the gypsum board papers, as therein disclosed, was affected by the total acidity of the paper-making system. To maintain a constant acidity in the paper-making system, it was the practice prior to the present invention to add, at the paper machine wet end, which is where the paper is formed, a mixture of aluminum sulfate and sulfuric acid, hereinafter referred to as an alum-acid mixture. This alum-acid mixture was added in whatever quantities were found necessary to maintain a constant acidity, preferably in the range of about 4 to 6 pH. Usage of an amount of alum-acid mixture to provide a pH of about 4 to 6 in the paper-making system was found to produce a preferred cure rate with other factors affecting cure rate at preferred conditions.

This method of manufacture of the paper presented problems, however, in the initial attainment of the desired pH and acidity throughout the paper-making system upon startup of such manufacture and secondly, in the maintenance of the substantially constant pH and acidity desired throughout the system, to prevent the manufacture of papers of inconsistent cure rates. For example, during the first minutes of startup a very considerable amount of paper is manufactured prior to attainment of appropriate pH and acidity of the system which, as a result, will have widely varying mixtures of rates of cure and must all be scrapped.

SUMMARY OF THE INVENTION

The present invention is directed to the addition of alum to a completely formed paper substantially simultaneously with the addition of a curable hydrophobic organo-silicone resin, to provide a controlled cure-rate, without the need for a close control of the acidity of the paper-making system used in the manufacture of this completely formed paper.

It is an object of the invention to provide a simpler controlled, easily started process for producing paper having a hydrophobic organo-silicone resin treatment of a controlled cure-rate.

It is a further object to provide a process of making gypsum board from paper having a cured hydrophobic organo-silicone treatment wherein equal advantages of said treatment will be provided by only approximately half the previous amounts necessary of silicone or wherein with equal silicone, amount of starch required in the gypsum core is approximately half of that previously required.

In accordance with our invention, an improved process for making paper cover sheets for gypsum wallboard is provided, wherein after a continuous web of paper is formed on a conventional paper-making machine, and substantially dried on a conventional series of paper machine driers, the surface of the paper cover sheet which will subsequently be the inner surface, abutting the core of a gypsum wallboard, is treated substantially simultaneously with a curable hydrophobic organo-silicone resin and with alum.

In the preferred form of the invention, a multi-ply paper is formed on a multi-cylinder paper-making machine. The paper included, for example, nine plies. The present invention relates to a treatment applied to the exposed surface of the first ply of the multi-ply paper, referred to as the bond ply. In a typical nine-ply paper, plies one and two are referred to as bottom liner plies, plies three through six as filler plies, plies seven and eight as underliner plies and ply nine as a topliner ply.

In the formation of the plies, in their respective nine cylinders, the stock supplied to plies three through nine includes the commonly used rosin and alum sizing additives. Plies one and two are formed of paper pulp which is substantially free of rosin and alum. It is well understood that where the rosin and alum are used, the purpose of the alum is to cause the precipitation of the rosin onto the paper fibers, whereby the rosin will be retained in the ply and function as a sizing material providing therein essentially a degree of water repellency.

The desired stock formulations for the respective nine plies are pre-mixed and fed as aqueous slurries to the respective nine cylinder vats for the formation of the individual plies on rotary cylinder screens in each cylinder vat. The respective plies are continuously removed, still retaining considerable water, from the several cylinders and assembled into a laminated sheet, and carried by a continuous felt conveyor to press portions of the machine to remove some of the water and help consolidate the sheet. The laminated sheet advances thence through a dryer section and to a calender section of the overall paper-making machine. In the finished paper sheet, the average ply thickness is slightly over .002 inch and the total nine-ply sheet is in the order of .020 inch thick. The completed sheet is consolidated to a degree such that the plies are substantially indistinguishable.

At the calender section, the continuous web of paper is still warm from the heat applied in the dryer section, and cools from about 260° F. as it reaches the calender section to about 160° F. as it leaves the calender section. The calender section includes two stacks of five calender rolls each, and the paper web advances progressively around the calender rolls of first one stack, the wet calender, and then the second stack, the dry calender, moving from the top calender roll downwardly in each stack.

An applicator-trough or water-box is mounted on the bottom calender roll of the wet calender and an aqueous solution of a mixture of organo-silicone resin and alum is continuously fed thereto, to be uniformly transferred thereby to the paper inner surface. This water-box technique of applying solutions of desired additives to a paper surface is a known technique.

In addition to the addition of organo-silicone resin at this water-box, as taught in the co-pending application of Bieri and Coia, Ser. No. 522,094, there is added the novel catalyst aluminum sulfate, commonly known as alum, by dissolving alum in the aqueous phase of the silicone resin emulsion. In a preferred form, the organo-silicone resin and alum solution is prepared within about three days of the time it is to be added to the paper by adding an aqueous solution of alum to an aqueous emulsion of silicone resin and sufficient water to produce a solution consisting of .5% silicone resin solids and 5% alum solids by weight, based on the total weight of the emulsion-solution.

The silicone resin solids in the emulsion-solution may be varied considerably over a range that will deposit from about 0.1 pound to about 4.0 pounds of silicone, or preferably between 0.2 and 2.0 pounds, on the bond ply of each ton of paper, this paper being of a basis weight of about 70 pounds per thousand square feet.

An emulsion-solution of .5% silicone resin solids has been found to deposit about .3 pound of resin per ton of typical 70 pounds per thousand square feet paper or about .011 pound per thousand square feet of paper. The use of 5% alum with the .5% silicone resin in the emulsion-solution results in the silicone resin curing within the paper in about 48 hours from the time the paper manufacture is completed. The amount of alum present has been found to determine the time it requires for the silicone to cure, the higher the alum percentage, the faster the cure. The completion of the cure is determined by determining the time for the Cobb value on the bond ply surface to decrease to a known low value indicating the completion of the development of the hydrophobic, or water-repellent, characteristic of cured hydrophobic organo-silicone resin coating or impregnation.

The Cobb test follows the general test outlined by T.A.P.P.I., but is modified as follows: In conducting this test, a 5″ x 5″ sample of the paper to be tested is weighed on a balance to the nearest 0.01 gm. This is the "dry weight." The sample is then clamped in a standard 100 sq. cm. Cobb ring (manufactured by W. & L. E. Gurley Instrument Co.) having an area of 100 square centimeters with the paper surface to be tested exposed. The Cobb ring is pre-heated to 100–120° F. prior to conducting the test in order to prevent rapid cooling of the test water. 150 ml. of clean tap water at 120° F. is then poured into the Cobb ring, covering the surface of the paper sample to be tested. A timer is started as soon as the water is poured into the ring. After the water has been in contact with the paper for exactly three minutes, the water is poured out of the ring. As rapidly as possible, the paper sample is removed from the ring, blotted "dry" of surface water with a highly absorbent blotter or paper towel, folded into quarters to reduce weight loss from evaporation, and reweighed to the nearest 0.01 gm. This is the "wet weight." (This last sequence of steps should not exceed 20 seconds.) The Cobb value is determined by subtracting the "dry weight" from the "wet weight."

It is desirable to have a Cobb value for the silicone-treated paper cover sheet at the time the gypsum board is manufactured of about 0.4 to about 1.0 gram, and more preferably about 0.4 to 0.7 gram, as measured on the surface of the paper cover sheet adjacent the gypsum core.

A 48 hour cure, producing an equal degree of water-repellency, can also be produced in accordance with the invention using an emulsion-solution containing 1% silicone resin and 5% alum, and in fact with the greater quantity of silicone the percentage of alum could be reduced to still obtain the 48 hour cure.

The above two examples have been cited for a comparison that has been made with the prior practice using silicone resins without the admixture at the calender section of any alum, wherein the cure required nine days, to show, in two alternative ways, the unexpected advantages provided by the invention.

| Bond Ply Treatment at Calender Stack | Bond Ply Cobb Value After Curing | Approximate Curing Time | Minimum Starch Required in #/M sq. ft. of Gypsum Board for 100% Bond (Humidified 20 Hours at 90° F., 87% R.H.) |
|---|---|---|---|
| 1% Silicone, No Alum | 0.58 | 9 days | 6.0 |
| 1% Silicone, 5% Alum | 0.50 | 48 hours | 3.0 |
| 0.5% Silicone, 5% Alum | 0.61 | ----do---- | 6.0 |

By the above data, it is shown that the combination of the alum in the bond ply treatment at the calender stack, in accordance with the invention, permits either (1) the reduction of the required starch in the gypsum board to half the requirement without the alum combination or (2) the use of only half as much silicone resin to obtain the same starch requirement as without the alum combination.

Whereas the 0.5% silicone solids solutions deposited about .3 pounds of silicone per ton of 70 pound basis weight paper, the 1% silicone solids solutions, with or without the alum, deposited about .6 pound of silicone per ton of similar paper.

In another embodiment of the invention a silicone resin and alum emulsion-solution is employed using .8% silicone solids and 1½% alum. Paper treated with this solution exhibits a cure time of about seven days. Paper made in accordance with the invention, using the seven day cure has been found to avoid certain gypsum board manufacturing problems that have arisen when two day cured paper was used in gypsum board plants having certain differences in their gypsum board manufacturing process from the most common plant processes, without affecting the starch savings. These differences have been found to relate most often to the types of foaming agents used in the gypsum core or to the placement of the foaming agent as when what is known as hard edge board is made with normal foaming of most of the gypsum core but a special unfoamed gypsum composition used at the edge portions.

In general, variations for any reason in the amount of silicone used in the emulsion-solution, should be accompanied by proportionately opposite changes in the amount of alum used if no change is desired in the curing time. Normally changes in curing time may be accomplished best by changing the percent alum concentration in the emulsion-solution, increasing alum to decrease curing time and vice versa.

As seen from the table further above, variation of the silicone usage may be desired for purposes such as decreasing the starch requirement by increasing the silicone usage. Since the extent of savings in starch per unit increase in silicone usage will vary with many other variable factors involved in gypsum board manufacture, the best economics will need be determined for each new situation.

By way of example, silicone-alum emulsion-solutions may be used with solids contents varying from low silicone usage of about 0.15% silicone resin combined with up to about 10% alum to high silicone usage emulsion-solutions of about 6% silicone resin combined with preferably substantially less alum, for example as little as 0.1% alum. This range of composition of silicone-alum emulsion-solutions deposits an amount of silicone resin on the paper of from about 0.1 to 4.0 pounds per ton of 70 pound basis weight paper, or, in other words, per 28,600 sq. ft. of paper. Preferably the silicone solids are from about 0.3% to 3% and the alum solids are from about 0.6% to 6%.

In the preferred form above, the silicone resin and the alum were pre-mixed in the emulsion-solution, which single composition was then fed to the water-box. The invention further contemplates the separate addition to a single water-box of the silicone resin and the alum solution provided suitable means are provided for thorough mixing and uniform application of the materials to the paper. This separate addition of the alum catalyst has been found unnecessary, apparently because the catalyzing effect does not start until the water of the solution is substantially all removed, as occurs after application to the paper and the subsequent drying of the paper. An unexpected advantage of this retarding of the catalyzing by moisture is that the somewhat greater retention of moisture deep within a large roll of paper, as compared to those convolutions of the paper roll nearest the outside of the roll, counteracts the accelerating effect on cure resulting from the somewhat higher temperature retained in the paper deep within the paper roll, as compared to the more rapidly cooled outer portion of the roll.

The invention further contemplates other means for applying the silicone resin and the alum catalyst, such as, for example:

(1) spray application at the calender stacks of
 (a) the silicone resin-alum emulsion-solution or
 (b) the silicone resin and the alum solution, separately or
(2) roller application at the calender stacks of
 (a) the silicone resin-alum emulsion-solution or
 (b) the silicone resin and the alum solution, separately.

The particular silicone resins which may be used in the present invention may be any of many types which are catalyzed by an alum addition. The preferred silicone resin, in accordance with the invention, is a curable hydrophobic epoxy silicone. The use of a hydrophobic organosilicone in the gypsum board paper, with or without the alum combination of the present invention, provides a markedly improved bond between the paper and the gypsum core, particularly under the more trying wet or humid conditions. It minimizes the tendencies toward stratification of the gypsum core during its manufacture. It permits lowering of the amount of starch needed in the gypsum core formulation and rosin sizing in the paper with the consequent cost savings. It facilitates drying of the board, minimizes paper delamination often caused by drying, minimizing the need of wet strength resin additives in the paper.

The silicone resins may be obtained in the form of an aqueous emulsion which has been prepared in a conventional manner with conventional emulsifying agents, such as quaternary ammonium salts, higher aliphatic alcohol sulfates or polyoxy-ethylene derivatives of polyhydric alcohols. The silicone resin-alum emulsion-solution may be prepared by the preparation of an aqueous solution of alum with an amount of water which when the alum solution is combined with the silicon resin aqueous emulsion, an emulsion-solution will be obtained with the desired solids content of silicone resin and of alum, as for example the preferred .5% silicone resin, 5% alum composition. As stated above, this composition, in a waterbox on the wet calender stack of a gypsum board papermaking machine, deposited .011 pound of resin per thousand square feet of paper. This rate of deposit of silicone resin solids was produced at conventional paper machine speeds of about 300 to 500 feet per minute, applying the resin to paper which is substantially dry, and at about 200° F. The resin is applied uniformly throughout the bond ply surface of the paper. The distance into the paper to which the silicone resin penetrates varies with variation in the machine speed, the cure rate, etc., however it has been found that very little resin penetrates deeper than the first two plies.

The curing of the resin will be carried on while the paper is being stored, or being shipped, in large rolls, prior to its being used in the gypsum board manufacture. It is essential that the cure be complete, to the extent of the bond ply surface Cobb value being between 0.4 gram and 1.0 gram and preferably below 0.7 gram, prior to use in the gypsum board process.

The treated paper and a conventional gypsum slurry may be integrated at a gypsum board plant, formed into board form, cut to desired lengths and passed through a drying kiln. Preferably, however, a gypsum slurry containing substantially less starch is used than is required in prior processes. Although the amounts of starch required in prior boards and in boards of the invention vary widely contingent on many factors, the use of about 9 to 12 pounds of starch per thousand square feet of 2100 pounds per thousand square feet ½ inch thick board was common, prior to the development of hydrophobic silicone resin treated gypsum board papers. As set forth hereinbefore, typical prior gypsum board with silicone resin treated paper permitted a decrease in minimum starch requirement to about 6 pounds per thousand square feet, and, with equal silicone resin usage, the present invention permits a further decrease to about 3 pounds per thousand square feet.

Example 1

In the preferred form of the invention, an epoxy silicone polymer is prepared having the average formula as:

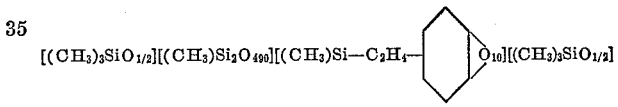

This epoxy silicone is a fluid having a specific gravity at 25° C./25° C. of between about 0.99 and 1.0. An aqueous emulsion of this epoxy silicone is then prepared having 40% by weight of silicone. An amount of this emulsion containing .5 weight unit of epoxy silicone resin and .775 weight unit of water was mixed with an alum solution containing 5 weight units of alum and 93.75 weight units of water to produce an emulsion-solution of .5% by weight silicone solids and 5% by weight alum solids. This emulsion-solution was applied, by the use of a water-box on the calender stack, to the bond ply of a gypsum board paper sheet. The treated paper had a bond ply Cobb value of .61 gram after 48 hours of cure. The paper was used in the manufacture of ½ inch gypsum wallboard, and the resulting board evidenced 100% wet bond after eight minutes of setting time, with a starch requirement of only six pounds of starch per thousand square feet for 100% dry bond.

Example 2

In a second example, an amount of the epoxy silicone 40% aqueous emulsion containing 1.0 weight unit of epoxy silicone resin and 1.5 weight units of water was mixed with an alum solution containing 5 weight units of alum and 92.5 weight units of water to produce an emulsion solution of 1% by weight silicone solids and 5% by weight alum solids. This emulsion solution was applied, by the use of a water-box on the calender stack, to the bond ply of a gypsum board paper sheet. The treated paper had a bond ply Cobb value of .50 gram after 48 hours of cure. The paper was used in the manufacture of ½ inch gypsum wallboard, and the resulting board evidence 100% wet bond after eight minutes of setting time, with a starch requirement of only three pounds of starch per thousand square feet for 100% dry bond.

Having completed a detailed disclosure of the preferred embodiments of our invention so that those skilled in the art may practice the same, we contemplate that variations may be made without departing from the essence of the invention or the scope of the appended claims.

We claim:
1. The method of making paper for gypsum boards having a cured hydrophobic organo-silicone resin at the paper bond ply surface, comprising the steps of forming a gypsum board paper sheet and substantially drying said sheet, applying to the paper bond ply surface of said substantially dry sheet substantially simultaneously a curable hydrophobic organo-silicone resin and alum catalyst, and curing said resin while on said paper bond ply surface, in the presence of said alum catalyst.

2. The method of claim 1 wherein said resin is cured to the extent that the Cobb value of the paper bond ply surface is reduced to about 0.4 to 1.0 gram.

3. The method of claim 2 wherein said organo-silicone resin is an epoxy silicone.

4. The method of claim 3 wherein said resin and alum are pre-mixed and said pre-mixed resin and alum are applied to said substantially dry paper sheet surface while simultaneously calendering said paper sheet, by disposing the open side of an open-sided container in a position relative to said paper sheet, during said calendering, whereby a liquid in said open-sided container is continuously deposited on said paper sheet during said calendering, and maintaining a supply of said pre-mixed resin and alum in said open-sided container.

5. The method of claim 4 wherein the resin and alum are pre-mixed to form an emulsion-solution consisting of about 0.15% to about 6% silicone solids and form about 0.1% to about 10% alum solids.

6. The method of claim 4 wherein the resin and alum are pre-mixed to form an emulsion-solution consisting of about 0.3% to 3% silicone solids and from about 0.6% to 6% alum solids.

7. The method of claim 3 wherein said resin and said alum are separately applied and wherein said substantially dried paper is calendered, said separate applications of said resin and said alum being by disposing separate supplies of said resin and said alum, in liquid form, whereat said separate liquids are continuously deposited on said paper surface during said calendering.

8. The method of making paper-covered gypsum board comprising the steps of making paper having a cured hydrophobic organo-silicone resin at the paper bond ply surface by the method of claim 1, forming a core of cementitious gypsum slurry, laminating said core to said paper bond ply surface, and drying said gypsum board.

9. The method of making paper-covered gypsum board comprising the steps of making paper having a cured hydrophobic organo-silicone resin at the paper bond ply surface by the method of claim 3, forming a core of cementitious gypsum slurry, laminating said core to said paper bond ply surface, and drying said gypsum board.

10. The method of making paper-covered gypsum board comprising the steps of making paper having a cured hydrophobic organo-silicone resin at the paper bond ply surface by the method of claim 5, forming a core of cementitious gypsum slurry, laminating said core to said paper bond ply surface, and drying said gypsum board.

References Cited

UNITED STATES PATENTS

| 3,389,042 | 6/1968 | Bieri et al. | 162—164 X |
| 2,634,252 | 4/1953 | Warrick. | |

HOWARD R. CAINE, Primary Examiner

U.S. Cl. X.R.

161—155; 260—37, 46.5

PO-1050
(5/69)

UNITED STATES PATENT OFFICE
CERTIFICATE OF CORRECTION

Patent No. 3,481,829      Dated December 2, 1969

Inventor(s) John D. Shull, Jr., and John W. Klems

It is certified that error appears in the above-identified patent and that said Letters Patent are hereby corrected as shown below:

Column 5, line 63, "silicon" should be ---silicone---.

Column 6, line 36, the portion of the formula in the second bracket which reads:

"$[(CH_3)Si_2O_{490}]$" should be $[(CH_3)_2SiO_{490}]$;

same column, line 44, ".775" should be ---.75---.

SIGNED AND
SEALED
FEB 24 1970

(SEAL)
Attest:

Edward M. Fletcher, Jr.
Attesting Officer

WILLIAM E. SCHUYLER, JR.
Commissioner of Patents